3,590,075
COPOLYMERIZATION OF CARBON MONOXIDE
WITH ALKYLENE OXIDE
George L. Bata and Kshatra Pati Singh, Montreal, Quebec,
Canada, assignors to Union Carbide Canada Limited,
East Toronto, Ontario, Canada
No Drawing. Filed Sept. 22, 1967, Ser. No. 669,716
Int. Cl. C07c 69/66
U.S. Cl. 260—484                                  8 Claims

ABSTRACT OF THE DISCLOSURE

Copolymers of carbon monoxide and alkylene oxides are prepared by polymerizing the monomers at elevated temperature and pressure in the presence of a catalyst system comprising a salt of a Group VIII metal and a nitrogen-containing compound selected from amines and alkanolamines. The salts are preferably halides or carbonates.

---

This invention relates to novel copolymers and to a process of preparing such copolymers.

It has previously been proposed to react ethylene oxide and carbon monoxide using a cobalt carbonyl catalyst to form monoethylene glycol hydracrylate, a liquid. It is also known to copolymerize ethylene oxide and carbon monoxide using trialkylaluminium-cobalt acetylacetonate to provide a polymer containing both ester and ether groups.

According to the present invention there is provided a process which comprises copolymerizing carbon monoxide and an alkylene oxide at elevated temperature and pressure in the presence of a catalyst system comprising a salt, preferably a halide or carbonate of a Group VIII metal and an amine or an alkanolamine.

The Periodic System employed in this specification is the one published by the Fisher Scientific Company.

Alkylene oxides which may be copolymerized in accordance with the present invention are those derived from a single ethylenically unsaturated carbon to carbon linkage and containing 2 to 10 carbon atoms, preferably 2 to 6 carbon atoms. These compounds may be represented by the formula:

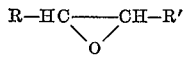

wherein R is hydrogen, methyl or ethyl, and R' is hydrogen or an alkyl group containing from 1 to 6 carbon atoms. Illustrative examples of such alkylene oxides are ethylene oxide, propylene oxide, 1,2-butylene oxide, 2,3-butylene oxide, 1,2-hexene oxide and 2,3-hexene oxide. The terminal epoxides are usually preferred since they are more commercially useful.

The catalyst system comprises two components. The first component is a salt, preferably a halide or carbonate salt of a Group VIII metal. Examples of such salts are nickelic chloride, ferrous chloride, ferric chloride, nickel carbonate, cobalt chloride and cobalt carbonate. The preferred compound is nickelic chloride. The second component is an amine or an alkanolamine. Any straight or branched chain amine or alkanolamine which forms a complex with the metal salt may be employed. Usually alkanolamines containing 2 to 10 carbon atoms are employed. Examples of such materials are monoethanolamine and diethanolamine, with monoethanolamine being preferred. The two components of the catalyst system may be employed over a large range of values. In general, however, molar ratios of the two components varying from 0.1:1 to 10:1 are employed. Preferably, the ratio is maintained between 1:1 and 1:0.5.

The amount of catalyst employed may vary over a broad range. In general, from 0.01 to 1 mole percent of catalyst, based on the alkylene oxide, is employed. Preferably 0.01 to 0.05 mole percent of catalyst, based on the alkylene oxide, is employed.

The copolymerization may be effected by contacting a mixture of one or more alkylene oxides and carbon monoxide containing 0.5 mole percent to 80 mole percent carbon monoxide, with the catalyst composition. The mixture of alkylene oxide and carbon monoxide preferably contains from 1 to 50 mole percent of carbon monoxide.

The polymerization may be effected by continuously bubbling the comonomers through the catalyst composition or by initially sealing a fixed amount of alkylene oxide and catalyst in a polymerization reactor and pumping in the carbon monoxide gas to the desired composition.

In the practice of the present invention there is usually a solvent of high dielectric constant present. The solvent also acts as a diluent for the catalyst system. Suitable solvents include water, methanol, dimethyl formamide and a mixture of water and methanol.

Reactive contact between the monomers and catalyst may be maintained by a variety of methods including constant stirring or agitation.

The polymerization takes place at an elevated temperature and pressure. The pressure is generally in the range 1000 to 2000 p.s.i.g., preferably from 1000 to 1500 p.s.i.g. The temperature may vary over a wide range depending on the nature of the epoxide employed. For example, when employing ethylene oxide as the alkylene oxide the preferred temperature range is from 70 to 100° C. For higher epoxides higher temperatures up to 160° C. are employed. Temperatures up to about 200° C. may be employed.

The copolymers produced by the process of the present invention may be represented by the general formula:

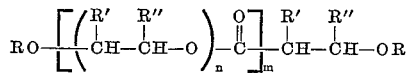

wherein R is hydrogen or methyl, R' is hydrogen or a $C_1$–$C_4$ carbon chain, R" is hydrogen or a $C_1$–$C_4$ carbon chain, and $n$ is greater than or equal to $m$ and is an integer from 1 to 50. The copolymer formed from ethylene oxide and carbon monoxide in the presence of water has the formula:

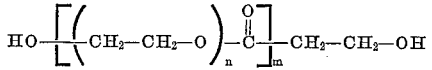

The copolymers generally have a molecular weight of from 100 to 3000. The copolymers are characterized by an IR spectrum having a carbonyl stretching frequency at 1730 to 1720 cm.$^{-1}$ and an ether absorption at 1150 to 1050 cm.$^{-1}$.

The present invention is illustrated by the following examples.

EXAMPLE I

A mixture of 300 gms. of ethylene oxide, 5 gms. of nickel chloride, 2 gms. of monoethanolamine and 2 ccs. of water were placed in 1 litre stainless steel autoclave equipped with a mechanical stirrer, electrical heating device and inlet and outlet openings. A mixture of 25 gms. of water and 100 gms. of methanol was added to the autoclave and the system flushed with nitrogen. The autoclave was next connected to a carbon monoxide source. The temperature was slowly raised to 100° C. and the carbon monoxide pressure to 1500 p.s.i.g. The reaction was allowed to proceed for four hours under constant stirring. The carbon monoxide pressure was maintained at 1500 p.s.i.g. throughout the whole course of the reaction. At the end of the four hour period there was no further uptake of carbon monoxide and the autoclave was cooled to room temperature and excess gas bled off. The residue in the autoclave was taken up in 500 mls. of acetone and the solution filtered. The filtrate was stripped off in a flash evaporator and the residue distilled under reduced pressure. The distillate boiling up to 170°/9 mm. amounted to 20 gms. and was discarded. The residue left weighed 250 gms. A molecular weight determination on a Mechrolab Vapour Pressure Osmometer Model 301 revealed a molecular weight for the residue of about 300. Infrared analysis of the product established the presence of ester groups at frequencies of 1740 to 1720 cm.$^{-1}$.

EXAMPLE II

Example I was repeated using 400 mls. of ethylene oxide, 2.5 gms. of nickel chloride, 1 gm. of monoethanolamine and 75 mls. of water. After twenty hours of reaction time, 350 gms. of product were obtained. This product was found by infrared analysis to contain ester groups.

EXAMPLES III–VIII

A series of reactions was carried out in identical manner to that of Example I. The results are reproduced below in Table I.

TABLE I

| Example Number | Pressure (p.s.i.g.) | Temperature (°C.) | Time (hours) | Ethylene oxide in feed (gms.) | Catalyst | Solvent | Weight of copolymer (gms.) | Molecular weight of product |
|---|---|---|---|---|---|---|---|---|
| III | 1,500 | 100 | 5¾ | 300 | 5 gms. NiCl$_2$ / 2 gms. MEA $^1$ | 25 gms. H$_2$O / 100 gms. CH$_3$OH | 200 | 180 |
| IV | 1,500 | 100 | 5⅔ | 500 | 2.5 gms. NiCl$_2$ / 1 gm. MEA | 25 gms. H$_2$O / 50 gms. CH$_3$OH | 400 | 180–200 |
| V | 1,500 | 100 | 22 | 500 | 2.5 gms. NiCl$_2$ / 1 gm. MEA | 25 gms. H$_2$O / 50 gms. CH$_3$OH | 400 | 250 |
| VI | 1,500 | 100 | 3¾ | 500 | 2.5 gms. NiCl$_2$ / 1 gm. MEA | 25 gms. H$_2$O / 50 gms. CH$_3$OH | 200 | 180–200 |
| VII | 1,500 | 100 | 19 | 400 | 2.5 gms. NiCl$_2$ / 1 gm. MEA | 75 gms. H$_2$O | 350 | 160–175 |
| VIII | 1,500 | 100 | 19 | 400 | 2.5 gms. NiCl$_2$ / 1 gm. MEA | 10 gms. H$_2$O / 70 gms. (CH$_3$)$_2$O | 80 | 150–160 |

$^1$ MEA is monoethanolamine.

We claim:

1. A process for producing ester containing copolymers which comprises: copolymerizing alkylene oxide of the formula

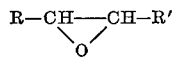

in which R is one selected from hydrogen, methyl and ethyl, and R' is one selected from hydrogen and an alkyl group containing from 1 to 6 carbon atoms, with carbon monoxide at a temperature of from 70° C. to 160° C. and a pressure of from 1000 to 2000 p.s.i.g. in the presence of from 0.01 to 1 mole percent based on the alkylene oxide of a catalyst system, said catalyst system consisting of a salt of a Group VIII metal and a nitrogen-containing compound selected from amines and alkanolamines containing 2–10 carbon atoms, said nitrogen containing compound being one which forms a complex with the salt of the Group VIII metal.

2. A process as claimed in claim 1 wherein the molar ratio of salt to nitrogen containing compound in the catalyst system is from 0.1:1 to 10:1.

3. A process as claimed in claim 2 wherein the nitrogen containing compound is one selected from the group consisting of monoethanolamine and diethanolamine.

4. A process as claimed in claim 3 wherein the salt of a Group VIII metal is one selected from the group consisting of nickelic chloride, ferrous chloride, ferric chloride, nickel carbonate, cobalt chloride and cobalt carbonate.

5. A process as claimed in claim 4 wherein the alkylene oxide is one selected from the group consisting of ethylene oxide, propylene oxide, 1,2-butylene oxide, 2,3-butylene oxide, 1,2-hexene oxide and 2,3-hexene oxide.

6. A process as claimed in claim 5 wherein the copolymerization is carried out in a solvent selected from water, methanol, dimethyl formamide and a mixture of water and ethanol.

7. A process as claimed in claim 6 wherein the copolymerization is carried out at a temperature of from 70° C. to 100° C.

8. A process as claimed in claim 6 wherein the catalyst system is present in an amount of from 0.01 to 0.5 mole percent based on the alkylene oxide.

References Cited

UNITED STATES PATENTS 3,259,649  7/1966  McClure _____ 260—484

CHARLES B. PARKER, Primary Examiner

P. J. KILLOS, Assistant Examiner